(12) United States Patent
Urfalioglu

(10) Patent No.: US 10,645,304 B2
(45) Date of Patent: May 5, 2020

(54) DEVICE AND METHOD FOR REDUCING THE SET OF EXPOSURE TIMES FOR HIGH DYNAMIC RANGE VIDEO/IMAGING

(71) Applicant: HUAWEI TECHNOLOGIES CO., LTD., Shenzhen, Guangdong (CN)

(72) Inventor: Onay Urfalioglu, Munich (DE)

(73) Assignee: HUAWEI TECHNOLOGIES CO., LTD, Shenzhen, Guangdong (CN)

( * ) Notice: Subject to any disclaimer, the term of this patent is extended or adjusted under 35 U.S.C. 154(b) by 19 days.

(21) Appl. No.: 15/976,378

(22) Filed: May 10, 2018

(65) Prior Publication Data

US 2018/0262673 A1 Sep. 13, 2018

Related U.S. Application Data

(63) Continuation of application No. PCT/EP2015/076290, filed on Nov. 11, 2015.

(51) Int. Cl.
*H04N 5/235* (2006.01)
*H04N 5/232* (2006.01)
*H04N 17/00* (2006.01)
*H04N 5/355* (2011.01)

(52) U.S. Cl.
CPC ......... *H04N 5/2356* (2013.01); *H04N 5/2352* (2013.01); *H04N 5/2355* (2013.01); *H04N 5/23245* (2013.01); *H04N 17/002* (2013.01); *H04N 5/23229* (2013.01); *H04N 5/35554* (2013.01); *H04N 5/35581* (2013.01)

(58) Field of Classification Search
CPC .................................................. H04N 5/2356
USPC ......................................................... 348/362
See application file for complete search history.

(56) References Cited

U.S. PATENT DOCUMENTS

| 4,344,681 | A | 8/1982 | Yamada |
| 2005/0099504 | A1 | 5/2005 | Nayar et al. |
| 2008/0187235 | A1 | 8/2008 | Wakazono et al. |
| 2009/0303347 | A1 | 12/2009 | Kwon et al. |
| 2009/0309998 | A1 | 12/2009 | Grosvenor et al. |
| 2010/0225782 | A1 | 9/2010 | Sambongi |

(Continued)

FOREIGN PATENT DOCUMENTS

| CN | 101166240 A | 4/2008 |
| CN | 101523897 A | 9/2009 |

(Continued)

*Primary Examiner* — Joel W Fosselman
(74) *Attorney, Agent, or Firm* — Womble Bond Dickinson (US) LLP

(57) ABSTRACT

The disclosure proposes a method for obtaining a High Dynamic Range (HDR) image. The method comprises storing a main set of selectable exposure times and a plurality of candidate reduced sets being respective subsets of the main set, controlling a capture of calibration images at respectively each exposure time of the main set, for each candidate reduced set, selecting the calibration images captured with the exposure times of the candidate reduced set and computing a score value depending on intensities of the selected calibration images, selecting a candidate reduced set from the candidate reduced sets on the basis of the computed score values, and controlling the capture of the plurality of images at respectively each exposure time of the selected candidate reduced set for obtaining the HDR image.

20 Claims, 4 Drawing Sheets

(56) References Cited

U.S. PATENT DOCUMENTS

| | | | |
|---|---|---|---|
| 2012/0212642 A1 | 8/2012 | Kehtarnavaz et al. | |
| 2014/0267883 A1* | 9/2014 | Vidal-Naquet | G06T 7/00 |
| | | | 348/362 |
| 2016/0352994 A1* | 12/2016 | Hsu | H04N 5/2351 |

FOREIGN PATENT DOCUMENTS

| | | |
|---|---|---|
| JP | 2003-524347 A | 8/2003 |
| JP | 2010-220207 A | 9/2010 |
| JP | 2014-179980 A | 9/2014 |
| WO | 2009/108182 A1 | 9/2000 |

* cited by examiner

DEVICE AND METHOD FOR REDUCING THE SET OF EXPOSURE TIMES FOR HIGH DYNAMIC RANGE VIDEO/IMAGING

CROSS-REFERENCE TO RELATED APPLICATIONS

This application is a continuation of International Application No. PCT/EP2015/076290, filed on Nov. 11, 2015, the disclosure of which is hereby incorporated by reference in its entirety.

TECHNICAL FIELD

The present disclosure generally relates to the field of computer vision and computational photography, and in particular to the task of High Dynamic Range Imaging and Video.

BACKGROUND

The disclosure addresses the topic of improving the High Dynamic Range Imaging (HDRI) and Video. High Dynamic Range (HDR) is an important method to improve the quality of current and future image and video capturing devices, such as smart-phones, cameras etc. HDRI is typically realized by capturing differently exposed images and merging them into an HDR image. The more different exposure settings and corresponding images are captured, the better is the quality of the final HDR image.

In the context of the present disclosure, the exposure time is the time interval which controls the amount of light the capturing device is exposed to during the capturing of an image or video frame. The larger the brighter the image/frame. A two-dimensional (2D) image or picture is a normal 2D image acquired with one camera, wherein the image may be defined by means of e.g. RGB or chrominance-luminance values. A texture is an area within an image which depicts content having significant variation in the color intensities. An over-exposed image area is an image area with too much light exposure, such that the majority of the area becomes white. An under-exposed image area is an image area with too less light exposure, such that the majority of the area becomes black.

It is known in the state of the art that HDR processing is based on a predefined set of different exposure times, i.e. an HDR image is obtained by merging a plurality of images captured at predefined set of exposure times. However, since the set of predefined exposure times is predefined, texture information may be lost in the generated HDR image.

For certain applications, the set of different exposure times to be used is limited. For example, the set of images captured at different exposure times is limited by time constraints. This holds for image HDR but especially for video HDR applications.

SUMMARY

Having recognized the above-mentioned disadvantages and problems, the present disclosure aims at improving the state of the art. In particular, the object of the present disclosure is to provide an improved HDR imaging performance, particularly under time constraints like for example in HDR video applications. A further objective is to provide an efficient solution for HDR imaging for image HDR and video HDR applications.

For example, in video HDR, images with alternating exposure times are captured and merged at each time step. Therefore, the set of different exposure times must be as small as possible to prevent ghosting effects. Ideally, only two different exposure times are used. However, since the set of exposure times includes two predefined exposure times, texture information may be lost in the generated HDR image or video.

The present disclosure particularly intends to improve the HDR imaging performance by choosing a small set from a larger set of different exposure times without losing too much texture or image information for the final HDR image. The above-mentioned object of the present disclosure is achieved by the solution provided in the enclosed independent claims. Advantageous implementations of the present disclosure are further defined in the respective dependent claims.

A first aspect of the present disclosure provides a device adapted to control a capture of a plurality of images for obtaining a High Dynamic Range, HDR, image. The device includes a storing unit adapted to store a main set of selectable exposure times and a plurality of candidate reduced sets being respective subsets of the main set. The device includes a calibration controlling unit adapted to control a capture of calibration images at respectively each exposure time of the main set. The device includes a computing unit adapted to, for each candidate reduced set, select the calibration images captured with the exposure times of the candidate reduced set and compute a score value depending on intensities of the selected calibration images. The device includes a selecting unit adapted to select a candidate reduced set from among the plurality of the candidate reduced sets on the basis of the computed score values of all candidate reduced sets. The device includes an HDR controlling unit adapted to control the capture of the plurality of images at respectively each exposure time of the selected candidate reduced set for obtaining the HDR image.

Thereby, by providing the computing unit adapted to compute a score value depending on intensities of the selected calibration images, and the selecting unit adapted to select a candidate reduced set on the basis of the computed score values, the HDR controlling unit is advantageously adapted to control the capture of the plurality of images in such a way that image and texture details may be preserved. The exposure times of the selected candidate reduced set is advantageously selected by the selecting unit so that the image and texture details of the captured images may be advantageously preserved for HDR imaging.

Particularly, the main set stored by the storing unit may be a fixed set of different selectable exposure times. Alternatively, the main set may be a sub-part of a fixed set of different selectable exposure times. The main set may be a sub-part that is chosen from the fixed set, or in other words, some exposure times may be excluded from the fixed set for obtaining the main set. For example, the main set may be a sub-part that is chosen depending on the image capturing conditions, e.g. depending on the brightness, or depending on a user selection made by a user. An example of a choice depending on the image capturing conditions is a main set chosen automatically by the device depending on the brightness, such that for example the main set may be a sub-set for night or dark situations for which the optimum reduced set is searched for. A further example is a main set chosen depending on a scene mode selection made by the user, such a selection mode being e.g. portrait, landscape, sunset, indoor, night portrait, or sports.

Particularly, the calibration images are images used for calibration. These images may be any type of images and no specific pattern is required. In particular, no predefined pattern or predefined color is required in the calibration images.

Particularly, the HDR controlling unit is adapted to control the capture of the plurality of images only at the exposure times of the selected candidate reduced set. The capture is then carried out only at the exposure times of the selected candidate reduced set, and not at additional exposure times that do not belong to the selected candidate reduced set. In other words, the HDR image is obtained by merging images that are captured only at the exposure times of the selected candidate reduced set.

Particularly, the selecting unit may be adapted to select the candidate reduced set having the optimum score value, for example the highest or lowest score value, from among the plurality of the candidate reduced sets. The optimum score value may reflect a high amount of disorder in the corresponding calibration images. Accordingly, the optimum score value may correspond to the highest or lowest score value depending on the specific calculation of the score value, i.e. depending on whether the high amount of disorder is reflected by the highest or lowest score value.

Particularly, the device is adapted to switch between an HDR calibration mode and an HDR operation mode. In the HDR calibration mode, the storing unit is adapted to store the main set of selectable exposure times and the plurality of candidate reduced sets being respective subsets of the main set, the calibration controlling unit is adapted to control the capture of the calibration images at respectively each exposure time of the main set, the computing unit is adapted to, for each candidate reduced set, select the calibration images captured with the exposure times of the candidate reduced set and compute the score value depending on intensities of the selected calibration images, and the selecting unit is adapted to select the candidate reduced set from among the plurality of the candidate reduced sets on the basis of the computed score values of all candidate reduced sets. In the HDR operation mode, the HDR controlling unit is adapted to control the capture of the plurality of images at respectively each exposure time of the selected candidate reduced set for obtaining the HDR image.

In one embodiment, the calibration images have a channel. Further, the computing unit is adapted, for each candidate reduced set, to compute the score value depending on intensities of the channel of the selected calibration images by:
  dividing the channel of each selected calibration image into pixel blocks according to a grid defining block positions;
  computing, for each pixel block of the channel of each selected calibration image, an intensity-dependent value dependent on pixel intensities in the pixel block and associating the intensity-dependent value to the pixel block;
  defining, for each block position, a block stack comprising the pixel blocks of the channel of each selected calibration image at the block position;
  identifying, for each block stack, the optimum value of the intensity-dependent values associated to the pixel blocks forming the block stack; and
  computing a channel score value of the candidate reduced set on the basis of the optimum values identified for each block stack of the channel, where the channel score value is the score value.

Thereby, the computed score value is advantageous in that it is a parameter reflecting an amount of texture details of the selected calibration images. Also, the pixel block formation instead of using the whole image helps in separating smaller regions of the image such that small region image-details may be potentially preserved and the computed score value reflects the texture of the selected calibration images.

A pixel intensity may relate to an intensity of a pixel within the pixel block. Alternatively, a pixel intensity may relate to an intensity of a group of pixels within the pixel block. The group of pixel may be comparable to a macro block used in image coding, and may for example consist of a rectangular or square group of for example 8*8 pixels. The pixel intensity of a group of pixels may be obtained by averaging the intensity of each pixel of the group of pixels.

The channel may be one of the red, green and blue channels in the RGB color space. The calibration images may be grayscale digital images. In that case, the grayscale images only have one channel. Alternative color spaces also define one or more channels. For example, in the YUV or Y'UV color spaces, the channel may correspond to the luminance (Y) or luma (Y'). Preferably, the channel may be a channel reflecting pixel intensities in the image.

Particularly, identifying the optimum value of the intensity-dependent values may consist in identifying the maximum or minimum value of the intensity-dependent values, depending on respectively whether the maximum or minimum value of the intensity-dependent values reflects the highest amount of disorder in the block stack. Preferably, identifying the optimum value of the intensity-dependent values may consist in identifying the maximum value of the intensity-dependent values.

In one embodiment, the calibration images are single channel images having a single channel or the device includes a converting unit adapted to convert the calibration images into single channel images having a single channel.

Thereby, since image and texture details shall be preserved for HDR imaging, single channel calibration images are enough for selecting the candidate reduced set since single channel calibration images reflect intensity changes in the calibration images. Using a single channel allows an efficient processing while still maintaining the intensity characteristics and variations of the image.

For example, the single channel may be one of the red, green and blue channels in the RGB color space. The calibration images may be grayscale digital images. In the alternative YUV or Y'UV color spaces, the single channel may correspond to the luminance (Y) or luma (Y'). In case the calibration images are not available as single channel images, the disclosure advantageously proposes to convert the multi channel calibration images into single channel calibration images. Color images may be built of several stacked color channels, each of them representing value levels of the given channel. For example, RGB images composed of three independent channels for red (R), green (G) and blue (B) color components may be converted into a grayscale image e.g. by weighted averaging the color components of the different channels. The converted single channel may also be the luminance (Y) or luma (Y') of the YUV or Y'UV color spaces. The luminance may e.g. be obtained by a linear combination of the three RGB color components by means of the following equation: $Y=0.2126\ R+0.7152\ G+0.0722\ B$.

In one embodiment, the calibration images have a plurality of channels, and the computing unit is adapted, for each candidate reduced set, to compute the score value depending on intensities of the channels of the selected calibration images by:

dividing each channel of each selected calibration image into pixel blocks according to a grid defining block positions;

computing, for each pixel block of each channel of each selected calibration image, an intensity-dependent value dependent on pixel intensities in the pixel block and associating the intensity-dependent value to the pixel block;

defining, for each channel and each block position, a block stack comprising the pixel blocks of the channel of each selected calibration image at the block position;

identifying, for each block stack, the optimum value of the intensity-dependent values associated to the pixel blocks forming the block stack;

computing, for each channel, a channel score value of the candidate reduced set on the basis of the optimum values identified for each block stack of the channel; and computing the score value depending on the respective channel score values of each channel.

Thereby, the use of calibration images having a plurality of channels for computing the score value may improve the selection of the candidate reduced set since the score value then take account of more intensity characteristics and variations in the calibration images.

In one embodiment, the features and effects regarding the case of calibration images having a channel also apply to the case of calibration images having a plurality of channels.

In one embodiment, the calibration images are multi-channel images and the score value is computed by combining the respective channel score values of each channel, or by selecting the optimum channel score among the channel score values of each channel.

The multi-channel images may for example be images defined in the RGB color space or in an alternative color space comprising several channels that preferably reflect pixel intensities in the images.

Thereby, combining the respective channel score values of each channel may consist in adding or multiplying the respective channel score values, such that the computed score value advantageously take account of the intensity characteristics of each channel. Alternatively, combining the respective channel score values of each channel may consist in selecting the optimum channel score, for example the maximum score value, among the channel score values of each channel, such that the computation of the score value may be simplified.

In one embodiment, the computing unit is adapted to compute the intensity-dependent value dependent on pixel intensities in the pixel block by:

computing a histogram of the pixel intensities of the pixel block; and computing an entropy value of the pixel block based on the histogram of the pixel intensities of the pixel block, the entropy value corresponding to the intensity-dependent value.

Thereby, the entropy value is advantageous in that it is a general measure for the amount of disorder, e.g. rapidly changing content in the images. A high texture in an image also includes rapidly changing pixel intensities, which the disclosure advantageously preserves in the HDR content.

In one embodiment, the entropy value of the pixel block is computed according to the equation:

$$E_{m,b} = -\sum_i p_i \log(p_i),$$

with $p_i$ being the probability of the occurrence of a pixel intensity i in pixel block b of calibration image m, with b being a block index, and m being an image index.

In one embodiment, the computing unit is adapted to compute the intensity-dependent value dependent on pixel intensities in the pixel block by:

computing a variance value of the pixel intensities of the pixel block.

Thereby, the variance value is advantageous as an alternative to the entropy based method in that it also reflects the amount of disorder, e.g. rapidly changing content in the images.

The pixel intensities may relate to intensities of pixels of the pixel block or to intensities of groups of pixels of the pixel block.

In one embodiment, the variance value of the pixel intensities of the pixel block is computed according to the equation:

$$v^2 = \frac{1}{X \cdot Y} \sum_{x=1}^{X} \sum_{y=1}^{Y} (i(x,y) - a)^2,$$

with X and Y being the size of the pixel block, i(x,y) being a pixel intensity at a pixel location (x,y) within the pixel block, and a being an average pixel intensity value within the pixel block.

Thereby, this computation according to the equation is an advantageous implementation for computing the intensity-dependent value based on the variance value of the pixel intensities.

In one embodiment, the computing unit is adapted to identify the optimum value of the intensity-dependent values associated to the pixel blocks forming the block stack by:

identifying the maximum value of the intensity-dependent values associated to the pixel blocks forming the block stack, and the computing unit is adapted to compute the channel score value of the candidate reduced set on the basis of the optimum values identified for each block stack of the channel by:

adding or multiplying the maximum values identified respectively for each block stack of the channel or values derived therefrom.

Thereby, the use of the maximum values as well as the addition or multiplication may provide an optimal selection of a candidate reduced set.

Particularly, the values derived from the maximum values may be a logarithm value thereof. Then, computing, for each block stack of the channel, the logarithm value of the identified maximum value, and adding the computed logarithm values may be advantageous in that such a computation may avoid numerical instabilities.

Particularly, multiplying the maximum values identified respectively for each block stack of the channel may be an alternative solution to the solution comprising adding the logarithm values.

In one embodiment, the block positions defined by the grid are adjacent or overlapping.

Thereby, the pixel blocks may be non-overlapping and adjacent to cover the whole calibration images. Alternatively, the pixel blocks may be overlapping so as to obtain more accurate results.

In one embodiment, the plurality of candidate reduced sets have a common size that is predefined or defined by a user.

A second aspect of the present disclosure provides a system including a device according to the first aspect of the present disclosure, an HDR image processing unit and at least a camera. The calibration controlling unit is adapted to control the capture of the calibration images by the at least a camera. The HDR controlling unit is adapted to control the capture of the plurality of images by the at least a camera. The HDR image processing unit is adapted to merge the plurality of images to obtain the HDR image.

Thereby, the HDR controlling unit is advantageously adapted to control the capture of the plurality of images in such a way that image and texture details may be preserved. The exposure times of the selected candidate reduced set is advantageously selected by the selecting unit so that the image and texture details of the captured images may be advantageously preserved, so that also the quality of the obtained HDR image may be improved.

Particularly, the HDR controlling unit is adapted to control the capture of the plurality of images only at the exposure times of the selected candidate reduced set, and the HDR image processing unit is adapted to merge only the images captured at the exposure times of the selected candidate reduced set.

Particularly, the system is adapted to switch between an HDR calibration mode and an HDR operation mode. In the HDR calibration mode, the calibration controlling unit is adapted to control the capture of the calibration images by the at least a camera (101). In the HDR operation mode, the HDR controlling unit is adapted to control the capture of the plurality of images by the at least a camera. In the HDR operation mode, the HDR image processing unit is adapted to merge the plurality of images to obtain the HDR image.

A third aspect of the present disclosure provides a method for controlling a capture of a plurality of images for obtaining a High Dynamic Range, HDR, image. The method includes storing a main set of selectable exposure times and a plurality of candidate reduced sets being respective subsets of the main set. The method includes controlling a capture of calibration images at respectively each exposure time of the main set. The method includes, for each candidate reduced set, selecting the calibration images captured with the exposure times of the candidate reduced set and computing a score value depending on intensities of the selected calibration images. The method includes selecting a candidate reduced set from among the plurality of the candidate reduced sets on the basis of the computed score values of all candidate reduced sets. The method includes controlling the capture of the plurality of images at respectively each exposure time of the selected candidate reduced set for obtaining the HDR image.

Thereby, by computing a score value depending on intensities of the selected calibration images, and selecting a candidate reduced set on the basis of the computed score values, it is advantageously possible to control the capture of the plurality of images in such a way that image and texture details may be preserved. The exposure times of the selected candidate reduced set is advantageously selected so that the image and texture details of the captured images may be advantageously preserved for HDR imaging.

Particularly, the main set may be a fixed set of different selectable exposure times. Alternatively, the main set may be a sub-part of a fixed set of different selectable exposure times. The main set may be a sub-part that is chosen from the fixed set, or in other words, some exposure times may be excluded from the fixed set for obtaining the main set. For example, the main set may be a sub-part that is chosen depending on the image capturing conditions, e.g. depending on the brightness, or depending on a user selection made by a user. An example of a choice depending on the image capturing conditions is a main set chosen automatically depending on the brightness, such that for example the main set may be a sub-set for night or dark situations for which the optimum reduced set is searched for. A further example is a main set chosen depending on a scene mode selection made by the user, such a selection mode being e.g. portrait, landscape, sunset, indoor, night portrait, or sports.

Particularly, the calibration images are images used for calibration. These images may be any type of images and no specific pattern is required. In particular, no predefined pattern or predefined color is required in the calibration images.

Particularly, it is advantageous to control the capture of the plurality of images only at the exposure times of the selected candidate reduced set. The capture is then carried out only at the exposure times of the selected candidate reduced set, and not at additional exposure times that do not belong to the selected candidate reduced set. In other words, the HDR image is obtained by merging images that are captured only at the exposure times of the selected candidate reduced set.

Particularly, it is advantageous to select the candidate reduced set having the optimum score value, for example the highest or lowest score value, from among the plurality of the candidate reduced sets. The optimum score value may reflect a high amount of disorder in the corresponding calibration images. Accordingly, the optimum score value may correspond to the highest or lowest score value depending on the specific calculation of the score value, i.e. depending on whether the high amount of disorder is reflected by the highest or lowest score value.

Particularly, the method is adapted to switch between an HDR calibration mode and an HDR operation mode. The HDR calibration mode includes storing the main set of selectable exposure times and the plurality of candidate reduced sets being respective subsets of the main set, controlling the capture of the calibration images at respectively each exposure time of the main set, and, for each candidate reduced set, selecting the calibration images captured with the exposure times of the candidate reduced set and computing the score value depending on intensities of the selected calibration images, and selecting the candidate reduced set from among the plurality of the candidate reduced sets on the basis of the computed score values of all candidate reduced sets. The HDR operation mode includes controlling the capture of the plurality of images at respectively each exposure time of the selected candidate reduced set for obtaining the HDR image.

In one embodiment, the calibration images have a channel. Further, computing, for each candidate reduced set, the score value depending on intensities of the channel of the selected calibration images includes:

dividing the channel of each selected calibration image into pixel blocks according to a grid defining block positions;

computing, for each pixel block of the channel of each selected calibration image, an intensity-dependent value dependent on pixel intensities in the pixel block and associating the intensity-dependent value to the pixel block;

defining, for each block position, a block stack comprising the pixel blocks of the channel of each selected calibration image at the block position;

identifying, for each block stack, the optimum value of the intensity-dependent values associated to the pixel blocks forming the block stack; and computing a channel score value of the candidate reduced set on the basis of the optimum values identified for each block stack of the channel, wherein the channel score value is the score value.

Thereby, the computed score value is advantageous in that it is a parameter reflecting an amount of texture details of the selected calibration images. Also, the pixel block formation instead of using the whole image helps in separating smaller regions of the image such that small region image-details may be potentially preserved and the computed score value reflects the texture of the selected calibration images.

A pixel intensity may relate to an intensity of a pixel within the pixel block. Alternatively, a pixel intensity may relate to an intensity of a group of pixels within the pixel block. The group of pixel may be comparable to a macro block used in image coding, and may for example consist of a rectangular or square group of for example 8*8 pixels. The pixel intensity of a group of pixels may be obtained by averaging the intensity of each pixel of the group of pixels.

The channel may be one of the red, green and blue channels in the RGB color space. The calibration images may be grayscale digital images. In that case, the grayscale images only have one channel. Alternative color spaces also define one or more channels. For example, in the YUV or Y'UV color spaces, the channel may correspond to the luminance (Y) or luma (Y'). Preferably, the channel may be a channel reflecting pixel intensities in the image.

Particularly, identifying the optimum value of the intensity-dependent values may consist in identifying the maximum or minimum value of the intensity-dependent values, depending on respectively whether the maximum or minimum value of the intensity-dependent values reflects the highest amount of disorder in the block stack. Preferably, identifying the optimum value of the intensity-dependent values may consist in identifying the maximum value of the intensity-dependent values.

In one embodiment, the calibration images are single channel images having a single channel or the method includes converting the calibration images into single channel images having a single channel.

Thereby, since image and texture details shall be preserved for HDR imaging, single channel calibration images are enough for selecting the candidate reduced set since single channel calibration images reflect intensity changes in the calibration images. Using a single channel allows an efficient processing while still maintaining the intensity characteristics and variations of the image.

For example, the single channel may be one of the red, green and blue channels in the RGB color space. The calibration images may be grayscale digital images. In the alternative YUV or Y'UV color spaces, the single channel may correspond to the luminance (Y) or luma (Y'). In case the calibration images are not available as single channel images, the disclosure advantageously proposes to convert the multi channel calibration images into single channel calibration images. Color images may be built of several stacked color channels, each of them representing value levels of the given channel. For example, RGB images composed of three independent channels for red (R), green (G) and blue (B) color components may be converted into a grayscale image e.g. by weighted averaging the color components of the different channels. The converted single channel may also be the luminance (Y) or luma (Y') of the YUV or Y'UV color spaces. The luminance may e.g. be obtained by a linear combination of the three RGB color components by means of the following equation: Y=0.2126 R+0.7152 G+0.0722 B.

In one embodiment, the calibration images have a plurality of channels. Computing, for each candidate reduced set, the score value depending on intensities of the channels of the selected calibration images includes:

dividing each channel of each selected calibration image into pixel blocks according to a grid defining block positions:

computing, for each pixel block of each channel of each selected calibration image, an intensity-dependent value dependent on pixel intensities in the pixel block and associating the intensity-dependent value to the pixel block;

defining, for each channel and each block position, a block stack comprising the pixel blocks of the channel of each selected calibration image at the block position;

identifying, for each block stack, the optimum value of the intensity-dependent values associated to the pixel blocks forming the block stack;

computing, for each channel, a channel score value of the candidate reduced set on the basis of the optimum values identified for each block stack of the channel; and computing the score value depending on the respective channel score values of each channel.

Thereby, the use of calibration images having a plurality of channels for computing the score value may improve the selection of the candidate reduced set since the score value then take account of more intensity characteristics and variations in the calibration images.

In one embodiment, the features and effects regarding the case of calibration images having a channel also apply to the case of calibration images having a plurality of channels.

In one embodiment, the calibration images are multi-channel images and the score value is computed by combining the respective channel score values of each channel, or by selecting the optimum channel score among the channel score values of each channel.

The multi-channel images may for example be images defined in the RGB color space or in an alternative color space comprising several channels that preferably reflect pixel intensities in the images.

Thereby, combining the respective channel score values of each channel may consist in adding or multiplying the respective channel score values, such that the computed score value advantageously take account of the intensity characteristics of each channel. Alternatively, combining the respective channel score values of each channel may consist in selecting the optimum channel score, for example the maximum score value, among the channel score values of each channel, such that the computation of the score value may be simplified.

In one embodiment, computing the intensity-dependent value dependent on pixel intensities in the pixel block includes:

computing a histogram of the pixel intensities of the pixel block; and computing an entropy value of the pixel block based on the histogram of the pixel intensities of the pixel block, the entropy value corresponding to the intensity-dependent value.

Thereby, the entropy value is advantageous in that it is a general measure for the amount of disorder, e.g. rapidly changing content in the images. A high texture in an image also includes rapidly changing pixel intensities, which the disclosure advantageously preserves in the HDR content.

In one embodiment, the entropy value of the pixel block is computed according to the equation:

$$E_{m,b} = -\sum_i p_i \log(p_i),$$

with $p_i$ being the probability of the occurrence of a pixel intensity i in pixel block b of calibration image m, with b being a block index, and m being an image index.

In one embodiment, computing the intensity-dependent value dependent on pixel intensities in the pixel block includes:
computing a variance value of the pixel intensities of the pixel block.

Thereby, the variance value is advantageous as an alternative to the entropy based method in that it also reflects the amount of disorder, e.g. rapidly changing content in the images.

The pixel intensities may relate to intensities of pixels of the pixel block or to intensities of groups of pixels of the pixel block.

In one embodiment, the variance value of the pixel intensities of the pixel block is computed according to the equation:

$$v^2 = \frac{1}{X \cdot Y} \sum_{x=1}^{X} \sum_{y=1}^{Y} (i(x, y) - a)^2,$$

with X and Y being the size of the pixel block, $i(x,y)$ being a pixel intensity at a pixel location (x,y) within the pixel block, and a being an average pixel intensity value within the pixel block.

Thereby, this computation according to the equation is an advantageous implementation for computing the intensity-dependent value based on the variance value of the pixel intensities.

In one embodiment, identifying the optimum value of the intensity-dependent values associated to the pixel blocks forming the block stack includes:
identifying the maximum value of the intensity-dependent values associated to the pixel blocks forming the block stack, and
computing the channel score value of the candidate reduced set on the basis of the optimum values identified for each block stack of the channel includes:
adding or multiplying the maximum values identified respectively for each block stack of the channel or values derived therefrom.

Thereby, the use of the maximum values as well as the addition or multiplication may provide an optimal selection of a candidate reduced set.

Particularly, the values derived from the maximum values may be a logarithm value thereof. Then, computing, for each block stack of the channel, the logarithm value of the identified maximum value, and adding the computed logarithm values may be advantageous in that such a computation may avoid numerical instabilities.

Particularly, multiplying the maximum values identified respectively for each block stack of the channel may be an alternative solution to the solution comprising adding the logarithm values.

In one embodiment, the block positions defined by the grid are adjacent or overlapping.

Thereby, the pixel blocks may be non-overlapping and adjacent to cover the whole calibration images. Alternatively, the pixel blocks may be overlapping so as to obtain more accurate results.

In one embodiment, the plurality of candidate reduced sets have a common size that is predefined or defined by a user.

A fourth aspect of the present disclosure provides a computer program having a program code for performing the method according to the third aspect of the present disclosure when the computer program runs on a computing device.

According to the present disclosure, in an HDR calibration mode a candidate reduced set or subset consisting of a number N of exposure times is selected from a main set or base set of available exposure times. The main set consists of a number M of available exposure times or candidate exposure times, wherein M>N. The selected candidate reduced set of exposure times is then used, e.g. in an HDR operation mode, for the actual HDR processing.

In order to reduce the set of M available exposure times, the size N of the reduced set of exposure times that is used for the actual HDR processing is defined by the user or predefined by the device. This definition of the size N is carried out preferably in the HDR calibration mode.

Then, in the HDR calibration mode, for each possible candidate reduced set comprising this number N of different exposure times, a score value is computed. After computing the score value of each possible candidate reduced set, the candidate reduced set with the best score value is selected as the solution, i.e. is selected for carrying out the HDR processing in the HDR operation mode.

The disclosure thus proposes an HDR calibration mode for selecting a candidate reduced set of exposure times while at the same time preserving most of the details in the final HDR solution.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by external entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above aspects and implementation forms of the present disclosure will be explained in the following description of specific embodiments in relation to the enclosed drawings, in which.

DETAILED DESCRIPTION OF THE EMBODIMENTS

Figure 1:
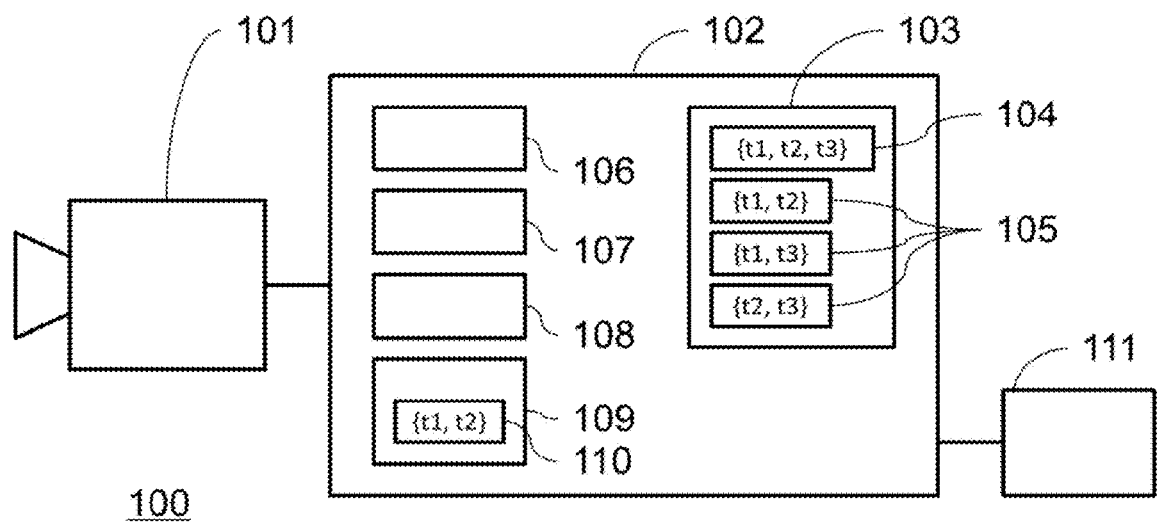
FIG. 1 shows a system according to an embodiment of the present disclosure.

FIG. 1 shows a system 100 according to an embodiment of the present disclosure.

The system 100 includes a device 102 according to an embodiment of the present disclosure.

The device 102 according to an embodiment of the present disclosure is adapted to control a capture of a plurality of images for obtaining a High Dynamic Range, HDR, image.

The device 102 includes a storing unit 103 adapted to store a main set 104 of selectable exposure times and a plurality of candidate reduced sets 105 being respective subsets of the main set 104.

The device 102 includes a calibration controlling unit 106 adapted to control a capture of calibration images at respectively each exposure time of the main set 104.

The device 102 includes a computing unit 107 adapted to, for each candidate reduced set 105, select the calibration images captured with the exposure times of the candidate reduced set 105 and compute a score value depending on intensities of the selected calibration images.

The device 102 includes a selecting unit 108 adapted to select a candidate reduced set 110 from among the plurality of the candidate reduced sets 105 on the basis of the computed score values of all candidate reduced sets.

The device 102 includes an HDR controlling unit 109 adapted to control the capture of the plurality of images at respectively each exposure time of the selected candidate reduced set 110 for obtaining the HDR image.

The system 100 according to an embodiment of the present disclosure includes the device 102 as well as an HDR image processing unit 111 and at least a camera 101.

In the system 100, the calibration controlling unit 106 is adapted to control the capture of the calibration images by the at least a camera 101. The HDR controlling unit 109 is adapted to control the capture of the plurality of images by the at least a camera 101. The HDR image processing unit 111 is adapted to merge the plurality of images to obtain the HDR image.

The system 100 shown in FIG. 1 includes a single camera 101 and may be used for determining two or more exposure times for the camera, so that the HDR image may be obtained from images captured only by this single camera 101 at only the exposure times defined by the selected candidate reduced set 110. Alternatively, the system may be a multi-camera system comprising more than one camera such that the HDR image may be obtained from images captured by the plurality of cameras, wherein each exposure times defined by the selected candidate reduced set 110 may be assigned to only one camera. A Single-camera or multi-camera system of to the disclosure may be used for obtaining an HDR image according to 2D or 3D imaging.

Figure 2:
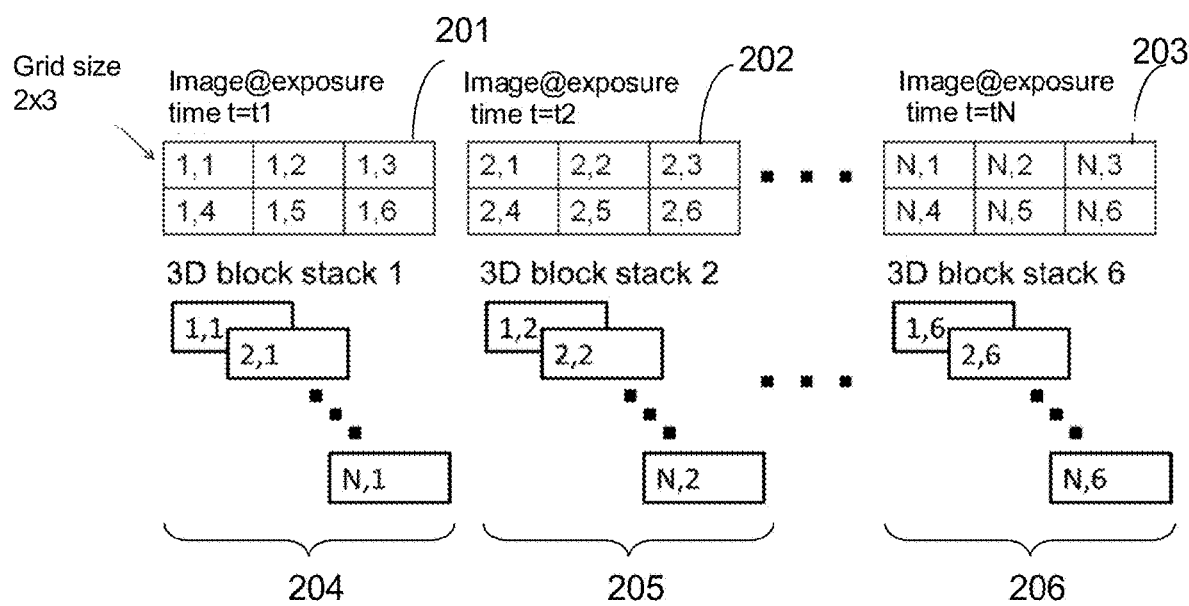
FIG. 2 shows calibration images and block stacks according to an embodiment of the present disclosure.

FIG. 2 shows calibration images 201, 202, 203 according to an embodiment of the present disclosure.

The capture of calibration images is controlled by the calibration controlling unit 106 in that calibration images are captured at respectively each exposure time of the main set 104.

For each candidate reduced set 105, the calibration images 201, 202, 203 captured with the exposure times of the candidate reduced set 105 are selected by the computing unit 107. Then, the computing unit 107 computes the score value depending on intensities of the selected calibration images 201, 202, 203.

In the particular embodiment of FIG. 1, the main set of selectable exposure times includes a number of M=3 available exposure times. The three available exposure times are t1, t2, t3 and the main set 104 corresponds to {t1, t2, t3}. In the shown embodiment the number N of exposure times for the HDR operation mode is chosen to be N=2. The plurality of candidate reduced sets 105 stored in the storing unit 103 thus corresponds to the sets {t1,t2}, {t1,t3}, {t2,t3}.

The candidate reduced sets may be all possible candidate reduced sets of size N that are obtainable from the main set of size M, as shown for example in the embodiment of FIG. 1. Alternatively, the candidate reduced sets may be a pre-reduced number of all possible candidate reduced sets obtainable from the main set.

Figure 3:
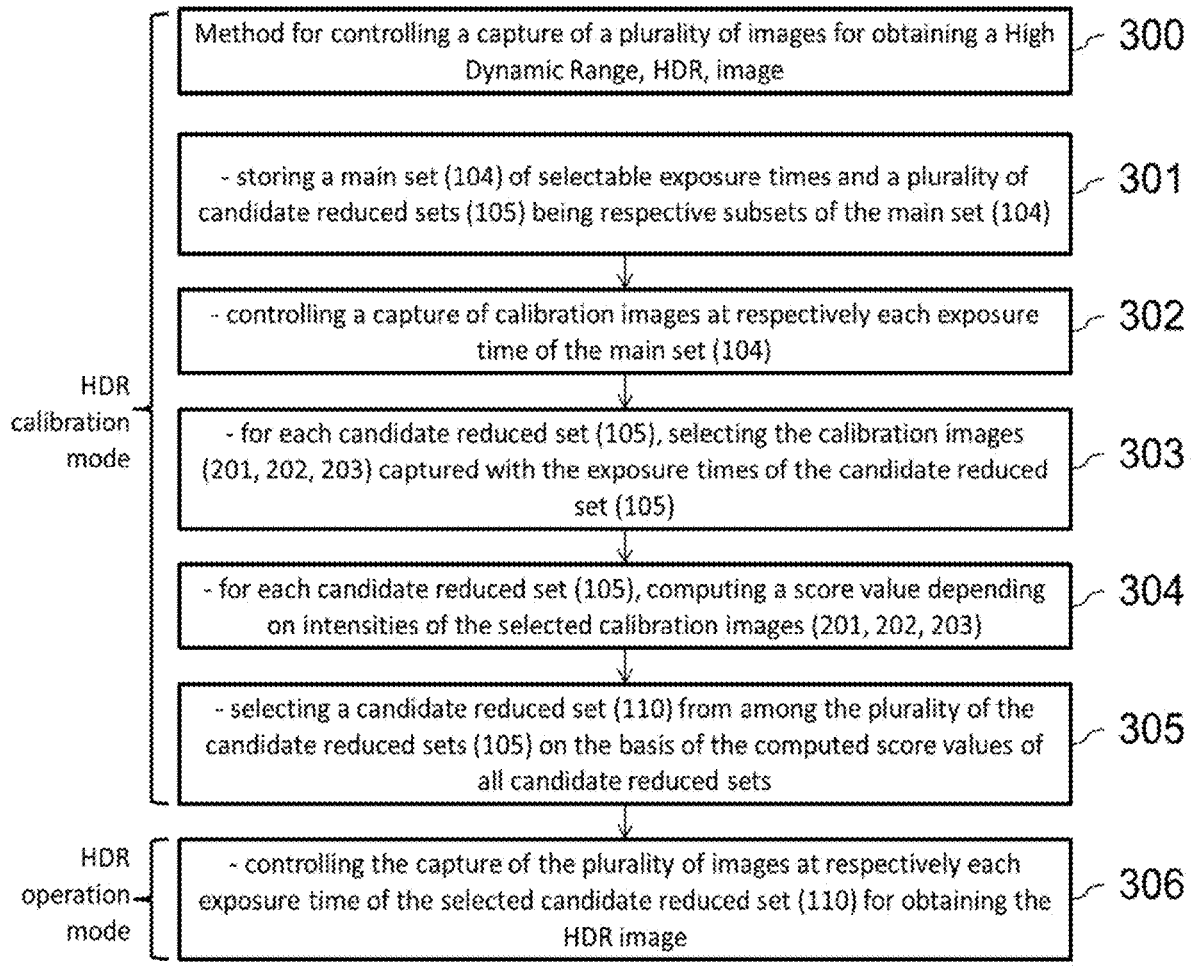
FIG. 3 shows a method according to an embodiment of the present disclosure.

FIG. 3 shows a method according to an embodiment of the present disclosure, and particularly a method 300 for controlling a capture of a plurality of images for obtaining a High Dynamic Range, HDR, image.

The method includes storing 301 a main set 104 of selectable exposure times and a plurality of candidate reduced sets 105 being respective subsets of the main set 104.

The method includes controlling 302 a capture of calibration images at respectively each exposure time of the main set 104.

The method includes, for each candidate reduced set 105, selecting 303 the calibration images 201, 202, 203 captured with the exposure times of the candidate reduced set 105 and computing 304 a score value depending on intensities of the selected calibration images 201, 202, 203.

The method includes selecting 305 a candidate reduced set 110 from among the plurality of the candidate reduced sets 105 on the basis of the computed score values of all candidate reduced sets.

The method includes controlling 306 the capture of the plurality of images at respectively each exposure time of the selected candidate reduced set 110 for obtaining the HDR image.

In a particular embodiment of the present disclosure, the calibration images 201, 202, 203 have a channel. In this embodiment, the computing unit 107 is adapted, for each candidate reduced set 105, to compute the score value depending on intensities of the channel of the selected calibration images 201, 202, 203 by dividing the channel of each selected calibration image 201, 202, 203 into pixel blocks 1,1 . . . 1,6; 2,1 . . . 2,6; N,1 . . . N,6 according to a grid defining block positions. In the embodiment of FIG. 2, each calibration image 201, 202, 203 is divided into a grid defining 6 block positions. For example the calibration image 201 that has been captured at the exposure time t1 includes 6 pixel blocks 1,1 1,2 1,3 1,4 1,5 and 1,6 defined by the grid. The grid has preferably a common size for all candidate images. In the embodiment of FIG. 2, the grid size is 2*3 pixel blocks. While the grid shown in FIG. 2 has a rectangular shape, a non-rectangular grid may also be used.

The computing unit 107 is adapted to compute, for each pixel block of the channel of each selected calibration image 201, 202, 203, an intensity-dependent value dependent on pixel intensities in the pixel block 1,1 ... 1,6; 2,1 ... 2,6; N,1 ... N,6 and associate the intensity-dependent value to the pixel block 1,1 ... 1,6; 2,1 ... 2,6; N,1 ... N,6.

The computing unit 107 is adapted to define, for each block position, a block stack 204, 205, 206 comprising the pixel blocks of the channel of each selected calibration image 201, 202, 203 at the block position.

For example, FIG. 2 shows that the upper left block position of the grid corresponds to the pixel block 1,1 of the calibration image 201. This block position also corresponds to the pixel block 2,1 of the calibration image 202, and to the pixel block N,1 in the calibration image 203. These pixel block 1,1 2,1 ... N,1 form together the block stack 204, also referred to as "3D block stack 1" in FIG. 2. Similarly, the block stack 205 includes the pixel blocks 1,2 2,2 ... N,2 located at the upper middle position of all calibration images 201, 202, 203. The shown block stack 206 includes the pixel blocks 1,6 2,6 N,6 that are located at the lower right block position defined by the grid. In other words, for each block position, all corresponding pixel blocks are collected and bundled as a respective 3D block stack 204, 205, 206.

In FIG. 2, each pixel block is represented by a pair (m,b), wherein b defines the block position of a specific calibration image m. The value m is a calibration image index, i.e. m is also an exposure time index since each calibration image corresponds to the one exposure time at which it has been captured. The value b is a block position index, wherein the grid used in FIG. 2 defines b=6 block positions, with b=1 to 6. FIG. 2 shows one candidate reduced set of N images and the corresponding b=6 block stacks of size N for each block position b.

The computing unit 107 is adapted to identify, for each block stack 204, 205, 206, the optimum value, particularly the maximum value, of the intensity-dependent values associated to the pixel blocks forming the block stack.

The computing unit 107 is adapted to compute a channel score value of the candidate reduced set 105 on the basis of the optimum value, particularly the maximum value, identified for each block stack 204, 205, 206 of the channel. The channel score value here corresponds to the score value.

In an alternative embodiment of the present disclosure, the calibration images 201, 202, 203 have a plurality of channels. In this embodiment, each channel of each selected calibration image 201, 202, 203 is divided into pixel blocks 1,1 ... 1,6; 2,1 ... 2,6; N,1 ... N,6, and the intensity-dependent value is computed for each pixel block of each channel and is associated to the pixel block. A block stack 204, 205, 206 is then defined for each block position of each channel, and the optimum value, particularly the maximum value, of the intensity-dependent values is identified for each block stack 204, 205, 206. Then, for each channel, a channel score value of the candidate reduced set is computed on the basis of the optimum values, particularly the maximum values, identified for each block stack of the channel. At last, the score value is computed depending on the respective channel score values of each channel, for example by combining the respective channel score values of each channel, or by selecting the optimum channel score among the channel score values of each channel.

Figure 4:
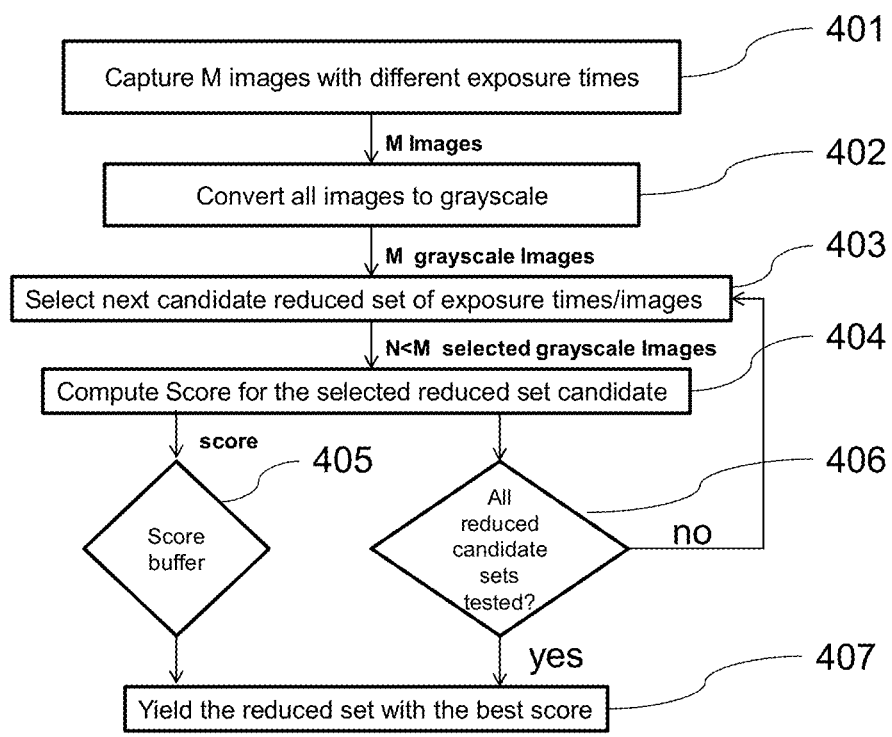
FIG. 4 shows a method according to an embodiment of the present disclosure.

FIG. 4 shows a method according to a further embodiment of the present disclosure, and particularly an embodiment of the HDR calibration mode for selecting the candidate reduced set 110 to be used during the HDR operation mode.

At first, M calibration images are captured 401 with different exposure times, i.e. with the M different exposure times comprised in the main set 104. Then, all calibration images are converted 402 to grayscale images, i.e. the calibration images are converted to calibration images having a single channel in form of a grayscale channel. A next candidate reduced set of exposure times is selected 403 and the score value of the selected candidate reduced set is computed 404 and buffered 405. A test is made whether all reduced candidate sets have been selected/tested 406. If the answer is no, then the next candidate reduced set if selected. If the answer is yes, the process go the final step of selecting/yielding 407 the candidate reduced set with the best score for the HDR operation mode.

FIG. 4 shows a serial or loop processing of the candidate reduced sets to obtain their score values for selecting the best reduced set. In alternative embodiments the step of computing 404 the score values may be performed in parallel for all or some candidate reduced sets, wherein the best candidate reduced set is selected based on a selection criterion, e.g. the selection of the reduced candidate set having the maximum score in case the score is determined based on an entropy as will be described in more detail in the embodiment of FIG. 5.

Figure 5:
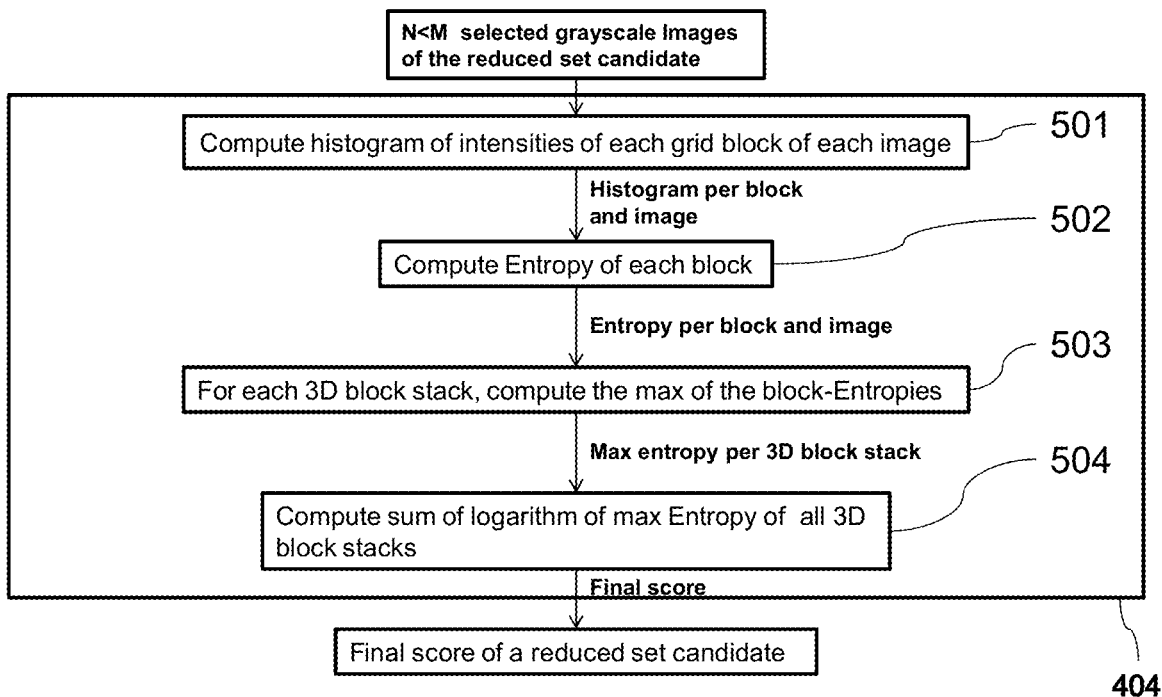
FIG. 5 shows a computation of a score value according to an embodiment of the present disclosure.

FIG. 5 shows a computation 304, 404 of a score value according to an embodiment of the present disclosure.

The computation is carried out for a candidate reduced set 105, which is illustrated in FIG. 5 in that the input of the computation is the number N<M of selected calibration images of the candidate reduced set 105. These calibration images in fact corresponds to the calibration images captured with exposure times of the candidate reduces set 105. In the embodiment of FIG. 5, the calibration images are in form of grayscale images, i.e. they are converted into single channel images.

In a first step, a histogram is computed 501 for each pixel block or grid block of each of the input calibration images. The histogram is a histogram of the pixel intensities of the pixel block, and describes the number of pixels $h_i$ having intensity i within the pixel block.

In a second step, an entropy value $E_{m,b}$ of each pixel block is computed 502 based on the histogram of the pixel intensities of the pixel block. The entropy value corresponds to the intensity-dependent value computed for each pixel block.

The histograms may be used to compute the entropy value of each calibration image m and pixel block b according to the following equation:

$$E_{m,b} = -\sum_{i=0}^{255} p_i \log(p_i) \qquad (1)$$

Wherein b is a block index, m is an image index, and $p_i$ is the probability of the occurrence of a pixel intensity i, with for example i=0, ..., 255.

The probability $p_i$ is directly computed from the histogram of the image-intensities:

$$p_i = \frac{h_i}{\text{Total number of pixels of block}} \qquad (2)$$

In a third step, the maximum entropy is computed 503 for each block stack 204, 205, 206. This is achieved by e.g. computing the entropy of each pixel block within the block stack and choosing the maximum entropy among these computed entropy values of each pixel block. The maximum entropy is given for a certain calibration image m. As a result, each pixel block stack b will be assigned a maximum entropy:

$$E_b^{max} = \max\{m|E_{m,b}\} \qquad (3)$$

In a fourth step, the sum of the logarithm of all block stacks is computed 504, which yields the channel score value of the reduced set candidate, the channel score value of the reduced set candidate corresponding to the score value computed 304 by the computing unit 107:

$$\text{Score} = \sum_b \log(E_b^{max}) \qquad (4)$$

An advantage of this step is that numerical instabilities may be avoided when computing the channel score value.

An alternative approach to the fourth step may consist in computing the product of all maximum entropy values of all block stacks 204, 205, 206.

The candidate reduced set with the best i.e. largest channel score value is then selected 307 as the solution, i.e. as the candidate reduced set to be used for the HDR operation mode. After having finished this described HDR calibration mode, the selected candidate reduced set of exposure times is chosen as fixed set of N exposure times for the HDR operation mode, e.g. for the actual HDR processing.

Optionally, the calibration images captured in the HDR calibration mode may also be used in the HDR operation mode for HDR processing. For example all M calibration images or only the N calibration images corresponding to the selected candidate reduced set of exposure times may be used in the HDR operation mode. Such a mode may be a combined calibration/operation mode.

In the second step, an entropy value has been computed 502. In an alternative approach and instead of computing the entropy, it is proposed to compute a variance $v^2$ according to the following equation:

$$v^2 = \frac{1}{X \cdot Y} \sum_{x=1}^{X} \sum_{y=1}^{Y} (i(x, y) - a)^2 \qquad (5)$$

wherein X and Y are the size of the pixel block, e.g. the width and height thereof, i(x,y) is a pixel intensity at a pixel location (x,y) within the pixel block, and a is an average pixel intensity value within the pixel block.

The embodiment of FIG. 5 includes the computation of the channel score value for single channel calibration images in form of grayscale images. Alternatively, the calibration images may also be multi-channel images like color images and for example RGB images. In such a case, a channel score value is computed for each channel independently and the channel score values of all channel are summed to form the score value computed 304 by the computing unit 107.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device adapted to control a capture of a plurality of images for obtaining a High Dynamic Range (HDR) image, the device comprising:
   a storing unit adapted to store a main set of selectable exposure times and a plurality of candidate reduced sets being respective subsets of the main set;
   a calibration controlling unit adapted to control a capture of calibration images at respectively each exposure time of the main set;
   a computing unit adapted to, for each candidate reduced set, select the calibration images captured with the exposure times of the candidate reduced set and compute a score value depending on intensities of the selected calibration images;
   a selecting unit adapted to select a candidate reduced set from among the plurality of the candidate reduced sets on a basis of the computed score values of all candidate reduced sets; and
   an HDR controlling unit adapted to control the capture of the plurality of images at respectively each exposure time of the selected candidate reduced set for obtaining the HDR image.

2. The device according to claim 1, wherein the calibration images have a channel, and wherein the computing unit is adapted, for each candidate reduced set, to compute the score value depending on intensities of the channel of the selected calibration images by:
   dividing the channel of each selected calibration image into pixel blocks according to a grid defining block position;
   computing, for each pixel block of the channel of each selected calibration image, an intensity-dependent value ($E_{m,b}$, v2) dependent on pixel intensities in the pixel block and associating the intensity-dependent value to the pixel block;
   defining, for each block position, a block stack comprising the pixel blocks of the channel of each selected calibration image at the block position;
   identifying, for each block stack, an optimum value ($E_b^{max}$) of the intensity-dependent values ($E_{m,b}$, v2) associated with the pixel blocks forming the block stack; and
   computing a channel score value of the candidate reduced set on a basis of the optimum values identified for each block stack of the channel, wherein the channel score value is the score value.

3. The device according to claim 2, wherein the calibration images are single channel images having a single channel or the device includes a converting unit adapted to convert the calibration images into single channel images having a single channel.

4. The device according to claim 1, wherein the calibration images have a plurality of channels, and wherein the computing unit is adapted, for each candidate reduced set, to compute the score value depending on intensities of the channels of the selected calibration images by:
   dividing each channel of each selected calibration image into pixel blocks according to a grid defining block position;
   computing, for each pixel block of each channel of each selected calibration image, an intensity-dependent value ($E_{m,b}$, $v^2$) dependent on pixel intensities in the pixel block and associating the intensity-dependent value to the pixel block;

defining, for each channel and each block position, a block stack comprising the pixel blocks of the channel of each selected calibration image at the block position;

identifying, for each block stack, an optimum value ($E_b^{max}$) of the intensity-dependent values ($E_{m,b}$, $v^2$) associated with the pixel blocks forming the block stack;

computing, for each channel, a channel score value of the candidate reduced set on a basis of the optimum values identified for each block stack of the channel; and computing the score value depending on the respective channel score values of each channel.

5. The device according to claim 4, wherein the calibration images are multi-channel images, and wherein the score value is computed by combining the respective channel score values of each channel, or by selecting the optimum channel score among the channel score values of each channel.

6. The according to claim 2, wherein the computing unit is adapted to compute the intensity-dependent value ($E_{m,b}$, $v^2$) dependent on pixel intensities in the pixel block by:

computing a histogram of the pixel intensities of the pixel block; and computing an entropy value ($E_{m,b}$) of the pixel block based on the histogram of the pixel intensities of the pixel block, the entropy value corresponding to the intensity-dependent value.

7. The device according to claim 6, wherein the entropy value of the pixel block is computed according to an equation as of:

$$E_{m,b} = -\sum_i p_i \log(p_i),$$

with $p_i$ being a probability of an occurrence of a pixel intensity i in pixel block b of calibration image m, with b being a block index, and m being an image index.

8. The device according to claim 2, wherein the computing unit is adapted to compute the intensity-dependent value dependent on pixel intensities in the pixel block by:

computing a variance value of the pixel intensities of the pixel block.

9. The device according to claim 8, wherein the variance value of the pixel intensities of the pixel block is computed according to an equation as of:

$$v^2 = \frac{1}{X \cdot Y} \sum_{x=1}^{X} \sum_{y=1}^{Y} (i(x,y) - a)^2,$$

with X and Y being a size of the pixel block, $i(x,y)$ being a pixel intensity at a pixel location (x,y) within the pixel block, and a being an average pixel intensity value within the pixel block.

10. The device according to claim 2, wherein the computing unit is adapted to identify the optimum value ($E_b^{max}$) of the intensity-dependent values ($E_{m,b}$, $v^2$) associated with the pixel blocks forming the block stack by:

identifying a maximum value ($E_b^{max}$) of the intensity-dependent values ($E_{m,b}$, $v^2$) associated with the pixel blocks forming the block stack, and wherein the computing unit is adapted to compute the channel score value of the candidate reduced set on the basis of the optimum values identified for each block stack of the channel by:

adding or multiplying the maximum values ($E_b^{max}$) identified respectively for each block stack of the channel or values derived therefrom.

11. The device according to claim 2, wherein the block position defined by the grid is adjacent or overlapping.

12. The device according to claim 1, wherein the plurality of candidate reduced sets have a common size that is predefined or defined by a user.

13. A system, comprising:
a device, wherein the device comprises
a storing unit adapted to store a main set of selectable exposure times and a plurality of candidate reduced sets being respective subsets of the main set,
a calibration controlling unit adapted to control a capture of calibration images at respectively each exposure time of the main set,
a computing unit adapted to, for each candidate reduced set, select the calibration images captured with the exposure times of the candidate reduced set and compute a score value depending on intensities of the selected calibration images,
a selecting unit adapted to select a candidate reduced set from among the plurality of the candidate reduced sets on a basis of the computed score values of all candidate reduced sets, and
an HDR (high dynamic range) controlling unit adapted to control the capture of the plurality of images at respectively each exposure time of the selected candidate reduced set for obtaining an HDR image;
an HDR image processing unit; and
at least one camera, wherein the calibration controlling unit is adapted to control the capture of the calibration images by the at least one camera, wherein the HDR controlling unit is adapted to control the capture of the plurality of images by the at least one camera, and wherein the HDR image processing unit is adapted to merge the plurality of images to obtain the HDR image.

14. A method for controlling a capture of a plurality of images for obtaining a High Dynamic Range (HDR) image, the method comprising:
storing a main set of selectable exposure times and a plurality of candidate reduced sets being respective subsets of the main set;
controlling a capture of calibration images at respectively each exposure time of the main set;
for each candidate reduced set, selecting the calibration images captured with the exposure times of the candidate reduced set and computing a score value depending on intensities of the selected calibration images;
selecting a candidate reduced set from among the plurality of the candidate reduced sets on a basis of the computed score values of all candidate reduced sets; and
controlling the capture of the plurality of images at respectively each exposure time of the selected candidate reduced set for obtaining the HDR image.

15. The method according to claim 14, wherein the calibration images have a channel; and the computing a score value depending on intensities of the selected calibration images comprises computing the score value depending on intensities of the channel of the selected calibration images by:

dividing the channel of each selected calibration image into pixel blocks according to a grid defining block position;

computing, for each pixel block of the channel of each selected calibration image, an intensity-dependent value ($E_{m,b}$, v2) dependent on pixel intensities in the pixel block and associating the intensity-dependent value with the pixel block;

defining, for each block position, a block stack comprising the pixel blocks of the channel of each selected calibration image at the block position;

identifying, for each block stack, an optimum value ($E_b^{max}$) of the intensity-dependent values ($E_{m,b}$, $v^2$) associated with the pixel blocks forming the block stack; and computing a channel score value of the candidate reduced set on a basis of the optimum values identified for each block stack of the channel, wherein the channel score value is the score value.

16. The method according to claim 15, wherein the calibration images are single channel images having a single channel, or the method comprises, converting the calibration images into single channel images having a single channel.

17. The method according to claim 14, wherein the calibration images have a plurality of channels, and the computing a score value depending on intensities of the selected calibration images comprises, for each candidate reduced set, computing the score value depending on intensities of the channels of the selected calibration images by:

dividing each channel of each selected calibration image into pixel blocks according to a grid defining block position;

computing, for each pixel block of each channel of each selected calibration image, an intensity-dependent value ($E_{m,b}$, $v^2$) dependent on pixel intensities in the pixel block and associating the intensity-dependent value with the pixel block;

defining, for each channel and each block position, a block stack comprising the pixel blocks of the channel of each selected calibration image at the block position;

identifying, for each block stack, an optimum value ($E_b^{max}$) of the intensity-dependent values ($E_{m,b}$, $v^2$) associated with the pixel blocks forming the block stack;

computing, for each channel, a channel score value of the candidate reduced set on a basis of the optimum values identified for each block stack of the channel; and computing the score value depending on the respective channel score values of each channel.

18. The method according to claim 17, wherein the calibration images are multi-channel images, and wherein the score value is computed by combining the respective channel score values of each channel, or by selecting the optimum channel score among the channel score values of each channel.

19. The method according to claim 17, wherein the intensity-dependent value ($E_{m,b}$, $v^2$) dependent on pixel intensities in the pixel block by:

computing a histogram of the pixel intensities of the pixel block; and computing an entropy value ($E_{m,b}$) of the pixel block based on the histogram of the pixel intensities of the pixel block, the entropy value corresponding to the intensity-dependent value.

20. The method according to claim 19, wherein the entropy value of the pixel block is computed according to an equation as of:

$$E_{m,b} = -\sum_i p_i \log(p_i),$$

with $p_i$ being a probability of an occurrence of a pixel intensity i in pixel block b of calibration image m, with b being a block index, and m being an image index.

* * * * *